US011845409B2

(12) United States Patent
Corghi

(10) Patent No.: US 11,845,409 B2
(45) Date of Patent: Dec. 19, 2023

(54) METHOD FOR INFLATING A TYRE

(71) Applicant: NEXION S.p.A., Correggio (IT)

(72) Inventor: Giulio Corghi, Correggio (IT)

(73) Assignee: NEXION S.P.A., Reggio Emilia (IT)

( * ) Notice: Subject to any disclaimer, the term of this patent is extended or adjusted under 35 U.S.C. 154(b) by 0 days.

(21) Appl. No.: 16/273,184

(22) Filed: Feb. 12, 2019

(65) Prior Publication Data

US 2019/0248344 A1 Aug. 15, 2019

(30) Foreign Application Priority Data

Feb. 13, 2018 (IT) .......................... 102018000002648

(51) Int. Cl.
*B60S 5/04* (2006.01)
*B60C 25/14* (2006.01)
(Continued)

(52) U.S. Cl.
CPC ............ *B60S 5/046* (2013.01); *B60C 25/145* (2013.01); *B60C 25/0515* (2013.01);
(Continued)

(58) Field of Classification Search
CPC ..... B60C 25/00; B60C 25/002; B60C 25/005; B60C 25/007; B60C 25/01; B60C 25/015; B60C 25/02; B60C 25/025; B60C 25/04; B60C 25/05; B60C 25/0503; B60C 25/0506; B60C 25/0509; B60C 25/0512; B60C 25/0515; B60C 25/0518; B60C 25/0521; B60C 25/0524; B60C 25/0527;
(Continued)

(56) References Cited

U.S. PATENT DOCUMENTS 3,461,938 A * 8/1969 Mueller
3,866,654 A * 2/1975 Duquesne
(Continued)

FOREIGN PATENT DOCUMENTS

DE 7540207 6/1976
EP 0 408 921 A1 1/1991
(Continued)

OTHER PUBLICATIONS https://www.pneumatictips.com/what-are-pneumatic-cylinders/, p. 2 (Year: 2012).*
(Continued)

*Primary Examiner* — Timothy P. Kelly
*Assistant Examiner* — Christopher M Afful
(74) *Attorney, Agent, or Firm* — Wentsler LLC

(57) ABSTRACT

A method for inflating a tyre mounted on a corresponding wheel rim comprises the following steps in sequence; placing a tool at an operating position, where a first bead of the tyre is interposed between the tool and a second bead of the tyre, and one end of tool is positioned axially between a first flange of the rim and a first rib of the rim and positioned radially between an outside surface of the rim and a tread of the tyre; blowing a gas under pressure through an inflation valve of the tyre into a chamber delimited by the tyre and by the rim, with the tool at the operating position, so that the first sidewall of the tyre is pressed against the end of the tool; removing the tool from the operating position.

18 Claims, 6 Drawing Sheets

(51) Int. Cl.
*G01L 17/00* (2006.01)
*B60C 25/05* (2006.01)
*B60C 25/138* (2006.01)

(52) U.S. Cl.
CPC ........ *B60C 25/0554* (2013.01); *B60C 25/138* (2013.01); *G01L 17/00* (2013.01)

(58) Field of Classification Search
CPC .............. B60C 25/053; B60C 25/0533; B60C 25/0536; B60C 25/0539; B60C 25/0542; B60C 25/0545; B60C 25/0548; B60C 25/0551; B60C 25/0554; B60C 25/0557; B60C 25/056; B60C 25/0563; B60C 25/0566; B60C 25/0569; B60C 25/0572; B60C 25/0575; B60C 25/0578; B60C 25/0581; B60C 25/0584; B60C 25/0587; B60C 25/059; B60C 25/0593
USPC .......................................................... 141/38
See application file for complete search history.

(56) References Cited

U.S. PATENT DOCUMENTS

| | | | |
|---|---|---|---|
| 4,506,708 A * | 3/1985 | Onuma | |
| 4,658,876 A * | 4/1987 | Augier | |
| 5,555,922 A * | 9/1996 | Brunner | |
| 7,267,155 B2 * | 9/2007 | Brahler, II | B60C 25/02 157/1.17 |
| 7,506,671 B2 * | 3/2009 | Peinelt | B60C 25/05 141/164 |
| 8,943,880 B2 * | 2/2015 | Vignoli | B60C 25/138 73/146 |
| 8,985,178 B1 * | 3/2015 | Vaninger | B60C 25/13 157/1.26 |
| 9,073,394 B1 * | 7/2015 | Clasquin | B60C 25/138 |
| 9,840,234 B2 | 12/2017 | Lawson et al. | |
| 10,131,326 B2 * | 11/2018 | Davidson | B60S 5/04 |
| 2010/0263801 A1 * | 10/2010 | Lawson | B60C 25/145 157/1.1 |
| 2011/0100558 A1 * | 5/2011 | Corghi | B60C 25/056 157/1.1 |
| 2016/0001617 A1 * | 1/2016 | Corghi | B60C 25/0512 29/894.31 |

FOREIGN PATENT DOCUMENTS

| | | |
|---|---|---|
| EP | 1 342 593 A1 | 9/2003 |
| EP | 2 193 875 A1 | 6/2010 |
| EP | 1 170 184 B1 | 12/2012 |

OTHER PUBLICATIONS

Atlas Automatic Car Tire Changer Use and Maintenance Manual, p. 25, Downloaded from http://cdn.gregsmithequipment.com/documents/manuals/tirechangers/tc733_manual.pdf (Year: 2012).*

International Search Report issued in IT 201800002648 dated Oct. 26, 2018.

* cited by examiner

FIG. 3A
FIG. 3B
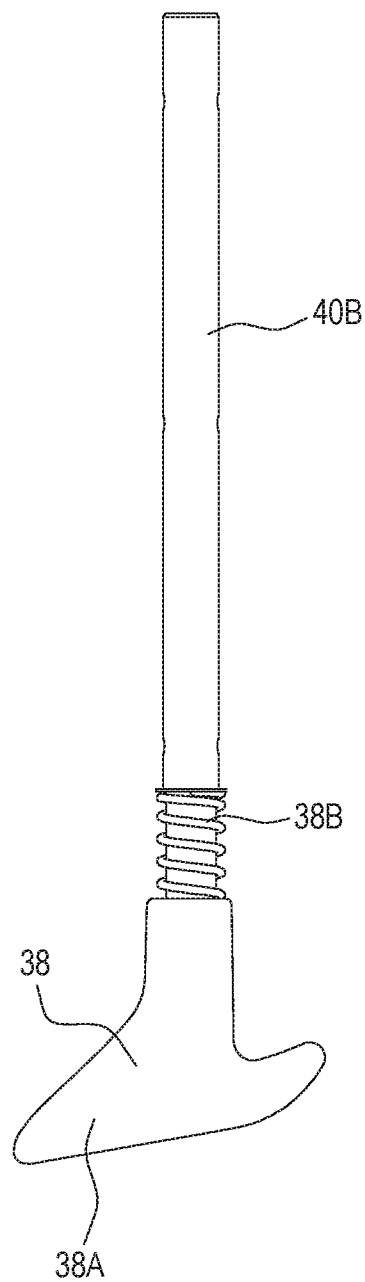
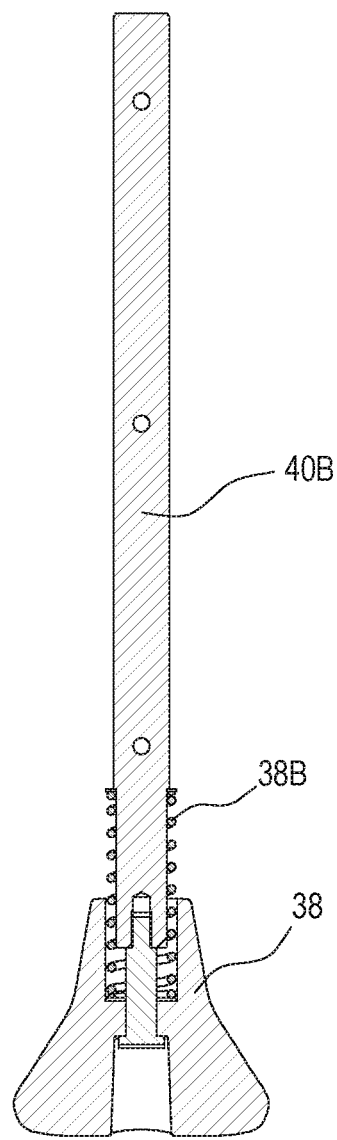

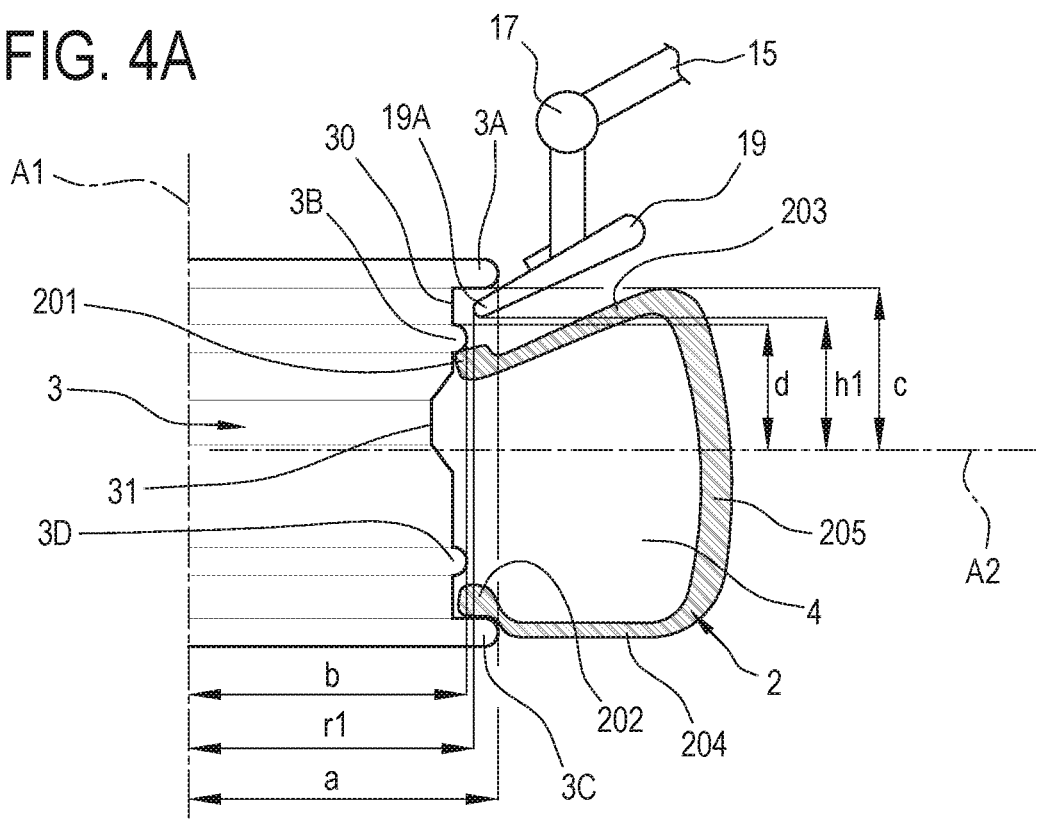
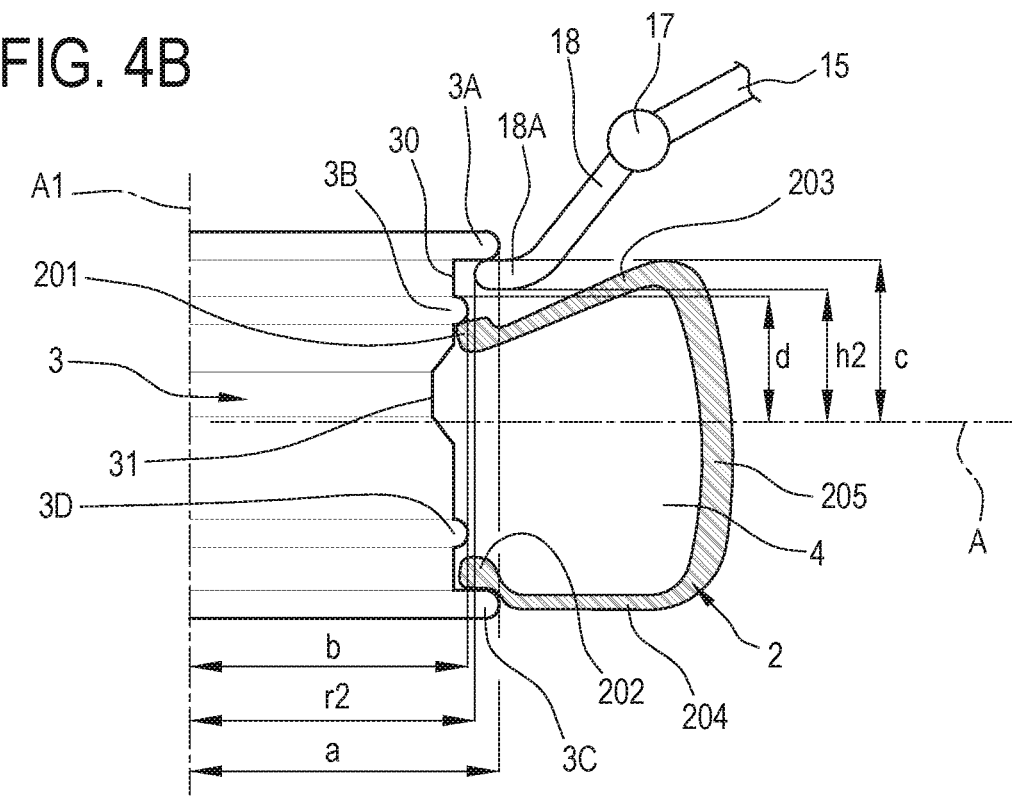

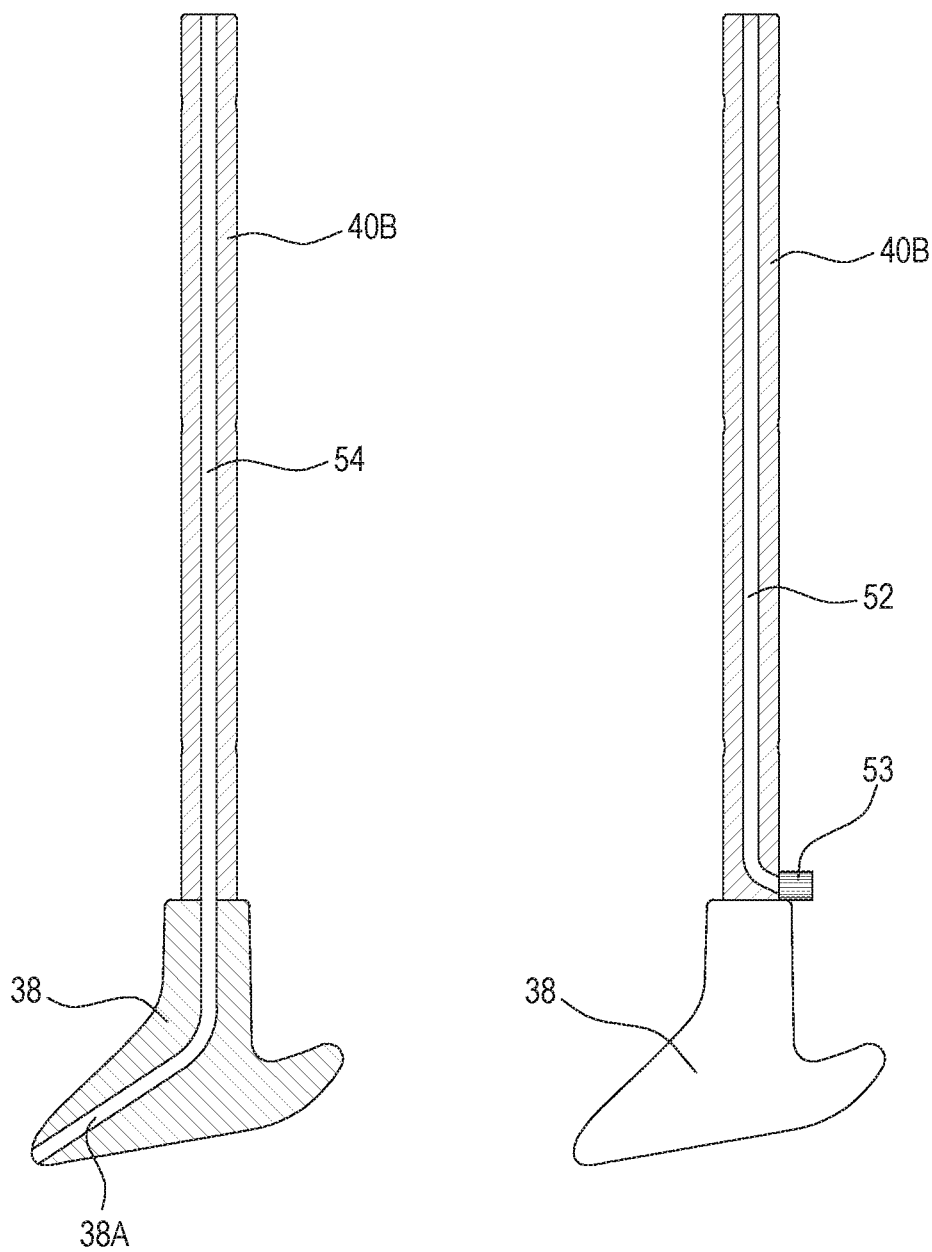

METHOD FOR INFLATING A TYRE

TECHNICAL FIELD OF THE INVENTION

This invention relates to a method for inflating a tyre using a tyre changing apparatus.

An apparatus for mounting and demounting a tyre to and from the corresponding wheel rim, also known as tyre changing apparatus, is a machine commonly used by tyre mechanics to mount and demount vehicle wheel tyres.

The apparatus may comprise an inflation unit configured to inflate the tyre after it has been mounted on the corresponding rim. The inflation unit comprises a pressurized gas source (for example, a compressor). The inflation unit comprises an inflation probe. The inflation probe is connectable to the pressurized gas source. One end of the inflation probe is configured to blow the gas into a chamber which is delimited by the tyre and the rim.

BACKGROUND OF THE INVENTION

The gas used for inflation is typically air or nitrogen. Usually, the end of the inflation probe is connectable to a stem of a tyre inflation valve through which the gas is blown into the chamber. An inflation probe connectable to a stem of a tyre inflation valve is known, for example, from patent document EP1170184B1.

The tyre includes a first bead and a second bead which, after mounting and inflation, are inserted into a first seat and a second seat of the rim, respectively. The first seat is defined by a first flange and a first rib of the rim which are spaced from each other and jut out radially from an outside surface of the rim. The second seat is defined by a second flange and a second rib of the rim which are opposite to the first flange and the first rib, and which are spaced from each other and jut out radially from an outside surface of the rim.

During mounting, the second bead is mounted at a respective temporary position, between the second rib and the first bead; similarly, the first bead is mounted at a respective temporary position, between the first rib and the second bead.

During inflation, the pressure of the chamber delimited by the tyre and the rim increases, and creates an expansive force in the chamber which pushes the first bead past the first rib, causing it to settle between the first rib and the first flange (that is, in the first seat) and the second bead past the rib, causing it to settle between the second rib and the second flange (that is, in the second seat). Typically, the first bead and the second bead do not move into the first seat and second seat round the full circle all at once but instead the circular arc of the first bead which moves into the first seat gradually increases until only a last portion of the first bead remains at the respective temporary position and, similarly, the circular arc of the second bead which moves into the second seat gradually increases until only a last portion of the second bead remains at the respective temporary position; thus, when the last portion of the first bead also moves past the first rib, it strikes the first flange with great force and makes a (first) loud noise; similarly, when the last portion of the second bead also moves past the second rib, it strikes the second flange with great force and makes a (second) loud noise. This noise is particularly unpleasant and harmful to operators responsible for inflating the tyre; the noise made by the first bead, which is closer to the operator's face is particularly unpleasant. In effect, it is a harsh, sudden noise which operators are forced to hear many times in the course of a working day (twice for each tyre inflated). Moreover, the impact lifts the dust that may be present on the tyre sidewall into the air, with negative consequences on the healthiness of the working place and thus on the health of operators working there. Moreover, the impact of the tyre bead against the rim flange may, over time, damage the rim and/or the tyre.

Alternative tyre inflation methods are also known which do not involve using the inflation valve. For example, patent document EP2193875A1 provides an inflation method using an inflation probe whose end is positioned between a wheel flange and the tyre, at a position proximal to the respective seat of the respective bead. The disadvantage of this method is that when the tyre pressure pushes the bead towards the respective flange, the end of the probe is compressed between the tyre and the rim; thus, the probe must be made of a material which is strong enough to resist crushing. To overcome this disadvantage, patent document U.S. Pat. No. 9,840,234B2 provides an inflation method which involves interposing a stirrup between the tyre bead and the rim flange to hold the bead down during inflation enough to prevent crushing the probe. The methods which involve placing an inflation probe directly between the rim and the tyre (thus bypassing the inflation valve) require an inflation apparatus and pressure monitoring system of considerable complexity because they do not allow blowing gas into the tyre once both the beads have been placed in the respective seats. Other examples of tyre fitting machines are disclosed in patent documents EP0408921A1, EP1342593A1 and DE7540207U.

SUMMARY OF THE INVENTION

This disclosure has for an aim to provide a method for inflating a tyre using a tyre changing apparatus, a tyre changing apparatus and an accessory for such apparatus which overcome the above mentioned drawbacks of the prior art.

This aim is fully achieved by the method, apparatus and accessory of this disclosure as characterized in the appended claims.

This disclosure relates to a method for inflating a tyre mounted on a corresponding wheel rim. More generally speaking, this disclosure relates to a method for mounting and demounting a tyre to and from the corresponding wheel rim. More generally speaking, this disclosure relates to a vehicle wheel service method.

The method is, more specifically, a method for inflating a tyre. The tyre is mounted on a corresponding wheel rim. The rim is mounted on a wheel-holder unit. In one embodiment, the wheel-holder unit forms part of a tyre changing apparatus. This disclosure therefore provides a method for inflating a tyre using a tyre changing apparatus (also known as apparatus for mounting and demounting a tyre to and from a corresponding wheel rim). In one embodiment, the wheel-holder unit has an axis of rotation which coincides with an axis of rotation of the wheel mounted thereon.

In one embodiment, the axis of rotation is oriented in a vertical direction, that is, parallel to the force of gravity. In this embodiment, the wheel has a first side, hereinafter referred to as "upper", located at a certain height from the floor, and a second side, hereinafter referred to as "lower", located at a height from the floor lower than the first side. A tool (for example, a bead breaker tool or a mounting/demounting tool) will be referred as "upper" if configured to work on the upper side of the wheel, and "lower" if configured to work on the lower side of the wheel.

The wheel-holder unit is configured to lock the wheel in place and set it in rotation about the axis of rotation of the wheel. In one embodiment, the tyre changing apparatus is equipped with a tool (or at least one tool or a plurality of tools). The tool may be used for mounting and/or demounting the tyre to and from the rim. The tool may be an auxiliary (dedicated) tool. The tool may be a bead pressing tool. The tool may be an upper bead breaker tool (that is, configured to work on an upper side of the wheel). The tool may be a sidewall pressing tool. The tool may be an upper demounting tool.

Hereinafter, the method is described with reference to the first bead; the description applies, mutatis mutandis, also to the second bead. For the second bead, a respective tool must be used. The respective tool for the second bead may be an auxiliary (dedicated) tool, a lower bead pressing tool, a lower demounting tool or a lower bead breaker tool. For example, it is possible to use the upper bead breaker tool to press the first side wall of the tyre and the lower bead breaker tool to press the second sidewall of the tyre simultaneously.

With regard to the tyre. In one embodiment of the disclosure (method and apparatus), the tyre includes a first bead. The first bead has a circular profile which is symmetrical about an axis of rotation of the tyre. The tyre includes a first sidewall. The first sidewall is connected to the first bead. The tyre comprises a second bead. The second bead has a circular profile which is symmetrical about an axis of rotation of the tyre. The tyre includes a second sidewall. The second sidewall is connected to the second bead. The tyre includes a tread. The tyre tread is cylindrically symmetrical about the axis of rotation of the tyre. The first sidewall has the shape of a circular crown (symmetrical about the axis of rotation of the tyre) having an inner ring connected to the first bead and an outer ring connected to the tyre tread. The second sidewall has the shape of a circular crown (symmetrical about the axis of rotation of the tyre) having an inner ring connected to the second bead and an outer ring connected to the tyre tread.

With regard to the rim, in one embodiment of the disclosure (method and apparatus), the rim includes an outside surface. The rim includes a first flange which juts out from the outside surface. The rim includes a second flange which juts out from the outside surface. In one embodiment, the rim includes a first rib. In one embodiment, the rim includes a second rib. The first and second ribs are interposed between the first flange and the second flange. The first rib juts out radially from the outside surface. The second rib juts out radially from the outside surface. The first rib and the second rib jut out radially from the outside surface less than the first flange and the second flange. The first rib is spaced from the first flange to define a first seat for the first bead. The second rib is spaced from the second flange to define a second seat for the second bead.

In one embodiment, the rim includes a central groove. The central groove is between the first rib and the second rib. The central groove is recessed relative to the outside surface of the rim.

In one embodiment of it, the method comprises a step of mounting the tyre on the corresponding wheel rim. In the step of mounting, the second bead is inserted into the second seat. In the step of mounting, the first bead is placed at a temporary position. At the temporary position, the first bead is positioned between the first rib and the second rib, near the first rib. At the temporary position, the first bead is interposed between the first rib and the central groove.

In one embodiment of it, the method comprises a step of placing the tool at an operating position. The step of placing the tool at an operating position follows the step of mounting it.

In one embodiment, when the tool is at the operating position, the first bead is interposed between the tool and the second bead. When the tool is at the operating position, one end of it is at a radial position (perpendicular to the axis of rotation of the tyre) between the outside surface of the rim and the tyre tread. Preferably, the radial position of the end of the tool is near the first flange of the rim. In one embodiment, when the tool is at the operating position, the end of the tool is at an axial position (parallel to the axis of rotation of the tyre) between the first flange and the first rib of the rim. In this embodiment, the tool is able to come into contact with the first sidewall of the tyre (to act on the noise caused by the impact of the first bead on the first flange).

The method comprises a step of blowing pressurized gas into a chamber. The gas may be air. The gas may be nitrogen. The chamber (or air chamber) is delimited by the tyre and the rim. In one embodiment, the step of blowing follows the step of placing the tool at an operating position. During the step of blowing, the tool is held at the operating position. The force applied by the pressure inside the chamber pushes the first bead to move past the first rib and closer to the first flange. The first bead then comes into contact with the first flange in a contact area which is progressively extended until the first bead is in contacts with the first flange round the full circle of it, with the exception of a last zone, where it remains between the first rib and the central groove. If gas continues to be blown into the chamber, in the absence of the tool, the first bead would impact the first flange in the last zone, causing a loud noise. Instead, in the presence of the tool, the first sidewall is pressed against the end of the tool (and thus abuts or rests on the end of the tool). The first bead is thus prevented from impacting the first flange. In effect, the tool applies a controlled force on the first sidewall of the tyre as the first bead moves from the first rib to the first flange. The tool is suitable to contact the first flank of the tire. In the presence of the tool (as a consequence of the presence of the tool in that position) the tool applies a controlled force on the first side (flan)k of the tire.

The method comprises a step of removing the tool from the operating position. When the tool is removed from the operating position, the first bead enters the first seat completely. The contact area between the first bead and the first flange is extended round the full circle of the first bead (including the last zone). However, since the end of the tool is axially interposed between the first flange and the first rib, the distance which the first bead travels from the abutment position against the end of the tool is smaller than it would be if it started from the first rib (in the absence of the tool) and thus its impact against the flange, and the resulting noise, is minimized (or at least reduced). Furthermore, the tool can be removed in controlled manner to slow down the movement of the bead against the first flange.

In one embodiment, when the tool is at the operating position, the radial position of the end of the tool is between an annular edge of the first flange and an annular edge of the first rib. By annular edge of the first flange and of the first rib is meant each of the respective outer edges furthest away from the axis of rotation of the wheel, that is to say, which jut out further from the outside surface of the rim. Thus, in this embodiment, the end of the tool is under the first flange. In this embodiment, when the first sidewall of the tyre is pressed against the tool, the tool is in turn pressed against the first flange. Thus, instead of the first bead impacting the first flange, the tool impacts the first flange. In one embodiment, the shape of the tool is such as to reduce the effect of the contact forces due to the tool's impact against the flange, so as to minimize the possible damage to the tool (for example, the surface of the tool which comes into contact with the first flange may be very inclined relative to the axis of rotation of the wheel, substantially perpendicular to it). In one embodiment, the tool is provided with a coat having sound absorption properties. In this embodiment, at least part of the outside surface of the tool is made from a material with good sound absorption properties. That way, if the tool impacts the first flange, the noise resulting from the impact is minimized (or at least reduced).

In one embodiment, when the tool is at the operating position, the radial position of the end of the tool is between the annular edge of the first flange and the tyre tread (in any case, near the first flange). In this embodiment, if the tyre has good elasticity, it is possible for the first bead to settle in the first seat (hence in contact with the first flange) when the tool is still at the operating position. Whatever the case, the presence of the tool allows slowing the first bead and thus damping the impact of the first bead against the first flange.

In one embodiment, the tool comprises an elastic element. The elastic element is, in one embodiment, a compressible rubber. In one embodiment, the elastic element also has good sound absorption properties.

In one embodiment, the elastic element externally covers the tool.

The elastic element is, in one embodiment, interposed between the end of the tool and a supporting rod of the tool. The end of the tool is thus interposed between the first sidewall of the tyre and the elastic element.

In one embodiment, the elastic element is a spring. The spring is preferably a compression spring: if compressed, it causes the end of the tool to move closer to the tool supporting rod. In this embodiment, when the pressure of the gas blown into the chamber exceeds a threshold value, the pressure inside the chamber presses the first sidewall of the tyre against the end of the tool, thereby compressing the spring. Compressing the spring causes the tool to be removed from the operating position. In one embodiment, compressing the spring causes the tool to be placed at an intermediate position, intermediate between the operating position and a rest position where the tool is clear of the tyre. The threshold value is the value where the force applied by the sidewall of the tyre against the tool is equal to the elastic force of the spring. Thus, in this embodiment, when the internal pressure of the tyre reaches the threshold value (which depends also on the rigidity of the spring, suitably selected according to the desired tyre pressure), the first sidewall displaces the tool from the operating position (placing it at the intermediate position) and the first bead moves into the first seat. The spring allows reducing the force with which the first bead strikes the first flange: in effect, part of this force is absorbed by the spring.

In one embodiment, the spring may be an expansion spring.

In one embodiment, the tyre changing apparatus includes an actuator. The actuator is preferably pneumatic. The actuator might, however, also be hydraulic or electrical. The actuator is configured to impart a movement of the tool from a rest position, where it is clear of the tyre, to the operating position, and vice versa.

In one embodiment, the actuator includes a liner. The tool is connected to a rod. The rod is slidable in the liner. In one embodiment, while gas is being blown into the chamber, the liner is pressurized at a pressure equal to the pressure inside the chamber. There is thus pressure equilibrium between the liner of the actuator and the chamber. The end of the tool is thus pressed towards the rod by the pressure in the chamber and towards the tyre sidewall by the actuator. Since the pressures in the liner and in the chamber are in equilibrium, the resulting force applied on the tool is zero. The tool is thus held at the operating position.

When the pressure in the chamber reaches a threshold value, the liner of the actuator is depressurized. In one embodiment, depressurization of the chamber is accomplished by choking (in such a way as to control the motion of the tool and thus the sidewall of the tyre). The threshold value corresponds to a desired pressure inside the chamber. That way, the pressure inside the chamber presses the first sidewall of the tyre against the end of the tool. The first sidewall, being pressed against the tool, causes the tool to be removed from the operating position. In effect, the pressure inside the chamber is no longer balanced by the pressure inside the actuator liner.

In one embodiment, the pressure inside the chamber is measured on the inflation device, preferably in proximity to the inflation valve. In one embodiment, the pressure inside the chamber is measured, during the step of blowing, using a pressure gauge inserted in the chamber. In one embodiment, the pressure inside the chamber is measured, during the step of blowing, by measuring the pressure of the compressed gas delivered to the inflation unit.

In one embodiment, the liner of the actuator is connected to the pressurized gas source of the inflation unit. The pressure inside the chamber can therefore be measured, during the step of blowing, using a pressure reducer connected to the actuator liner.

The method of this disclosure can also be applied in an embodiment in which the wheel-holder unit forms part of a machine for inflating a tyre. In this embodiment, the tool forms part of the machine for inflating the tyre. This disclosure also relates to an apparatus for mounting and demounting a tyre to and from the corresponding wheel rim (also known as tyre changing apparatus).

More generally speaking, this disclosure relates to an apparatus for mounting and/or demounting a tyre to and from the corresponding rim. More generally speaking, this disclosure relates to a vehicle wheel service system.

The apparatus is of the type described in patent document EP2962876B1, in the name of the present Applicant and incorporated herein by reference. It is expressly understood that all the functional and structural features of the apparatus of patent document EP2962876B1 can be applied to the tyre changing apparatus according to this embodiment.

The apparatus of this disclosure is used in particular to mount and/or demount a tyre to and from the corresponding rim of a wheel of a light vehicle such as, for example, a motor car. Nevertheless, it may be used to mount and/or demount a tyre to and from the corresponding rim of a wheel of a heavy vehicle.

The apparatus includes a wheel-holder unit. The wheel-holder unit is configured to lock the rim in place and set it in rotation about an axis of rotation of the wheel.

The apparatus includes an inflation unit. The inflation unit has an active configuration in which it is configured to blow a gas into a chamber which is delimited by the tyre and the rim. The gas may be air. The gas may be nitrogen. The tyre comprises an inflation valve which, when open, affords a channel through which gas can pass between the chamber and the outside. The gas is blown in through the tyre inflation valve. In one embodiment, the inflation unit comprises an inflation probe. In one embodiment, the inflation unit comprises a pressurized gas source. The inflation probe is connectable to the pressurized gas source. One end of the inflation probe is connectable to the tyre inflation valve. The inflation unit also has an inactive configuration in which gas is prevented from flowing out of the end of the inflation probe (and thus out of the inflation unit).

The tyre changing apparatus comprises a tool (or at least one tool or a plurality of tools). The tool may be used for mounting and/or demounting the tyre to and from the rim. The tool may be a bead pressing tool. The tool may be a bead breaker tool. The tool may be a sidewall pressing tool. The tool may be a demounting tool. The tool may be a supporting tool for the connector of the inflation valve. The tool may be a device used to make it easier to move the beads closer to the corresponding ribs.

The tool is movable between a rest position and an operating position. At the rest position, the tool is clear of the tyre. When the tool is at the operating position, the first bead is interposed between the tool and the second bead. When the tool is at the operating position, one end of it is positioned axially between the first flange and the first rib. When the tool is at the operating position, one end of it is positioned radially between the outside surface of the rim and the tyre tread.

The apparatus includes an operating configuration in which the tool is at the operating position and, at the same time, the inflation unit is in the active configuration. Thus, when the apparatus is in the operating configuration, the inflation unit is configured to blow a gas into the chamber when the tool is at the operating position.

In one embodiment, when the tool is at the operating position, the radial position of the end of the tool is between an annular edge of the first flange and an annular edge of the first rib.

In one embodiment, the tool is provided with a coat having sound absorption properties. In one embodiment, the tool has an outside surface which is made of a material with a high sound absorption coefficient.

In one embodiment, when the tool is at the operating position, the radial position of the end of the tool is between the annular edge of the first flange and the tyre tread (near the first flange).

In one embodiment, the tool includes an elastic element. The elastic element is, in one embodiment, a compressible rubber. The compressible rubber is, in one embodiment, interposed between the end of the tool and a supporting rod of the tool. In another embodiment, the compressible rubber covers the tool (it may be a fixed or removable coat).

In one embodiment, the elastic element is a spring. In one embodiment, the spring is a compression spring. The spring has a first end which is connected to a body of the tool (which the end of the tool is connected to).

The apparatus includes a tool supporting rod. The spring has a second end which is connected to the tool supporting rod. The spring is interposed between the rod and the end of the tool. When the spring is compressed, the end of the tool moves closer to the rod. In one embodiment, the spring is a tension spring.

In one embodiment, the apparatus comprises an actuator. The actuator is configured to move the tool from the rest position to the operating position. The actuator is preferably pneumatic. The actuator might be hydraulic or electrical. The actuator includes a liner. The tool supporting rod is slidable in the liner. In one embodiment, the inflation unit is selectively connectable to the actuator liner. In one embodiment, the apparatus comprises a first valve. In one embodiment, the inflation unit is selectively connectable to the actuator liner through the first valve. More specifically, the pressurized gas source is connectable to the actuator liner. That way, the actuator liner can be pressurized at a pressure equal to a pressure inside the chamber delimited by the rim and the tyre.

In one embodiment, the apparatus comprises a control unit.

In one embodiment, the apparatus comprises a pressure sensor. The pressure sensor is, in one embodiment, configured to measure a pressure of the chamber (that is, inside the chamber). The pressure sensor is, in one embodiment, configured to measure a pressure of the actuator liner (that is, inside the actuator liner). The pressure sensor is connected to the control unit. The pressure sensor is configured to send a pressure signal to the control unit. The pressure signal represents the pressure of the chamber. The pressure signal represents the pressure of the actuator liner.

In one embodiment, the apparatus comprises a discharge valve. The discharge valve is connected to the actuator liner. The discharge valve can be switched between an open position, in which the liner is connected to an outside atmosphere (for example by choking) and a closed position, in which the liner is isolated from the outside atmosphere.

In one embodiment, the control unit is programmed to control switching of the discharge valve from the closed to the open position as a function of the pressure signal. In one embodiment, the discharge valve is configured to control the flow of air towards the outside atmosphere. In one embodiment, controlling the flow of air towards the outside atmosphere is accomplished through the control unit.

In one embodiment, the control unit is programmed to control opening and/or closing of the first valve as a function of the pressure signal.

The control unit is thus configured to control the actuator.

In one embodiment, the apparatus comprises an interface. The interface is configured to set a threshold parameter representing a threshold pressure. The threshold pressure may be, for example, the desired pressure inside the chamber (also called "inflation pressure"). In one embodiment, the control unit is programmed to control switching of the discharge valve from the closed to the open position as a function of the pressure signal and of the threshold parameter. In one embodiment, the control unit is programmed to open and/or close the first valve as a function of the pressure signal and of the threshold parameter. More specifically, when the pressure detected by the pressure sensor exceeds the threshold pressure, the control unit is programmed to switch the discharge valve to the open position and to close the first valve. By closing the first valve, the actuator liner is cut off from the pressurized gas source. By opening the discharge valve, the actuator liner is depressurized to an ambient pressure (which may be atmospheric pressure).

In one embodiment, the apparatus comprises a camera. The camera is, in one embodiment, configured to capture an image representing a position of the first flange and a position of the first rib. The camera is, in one embodiment, configured to capture an image representing a position of the second flange and of the second rib. The camera is connected to the actuator to place the tool at the operating position as a function of the position of the first flange and of the position of the first rib (or as a function of the second flange and of the second rib). In one embodiment, the camera is connected to the control unit.

In one embodiment, the control unit is programmed to place the tool at the operating position just before triggering the step of blowing (by starting the pressurized gas source).

In one embodiment, the apparatus includes a switch configured to start placing the tool at the operating position.

In one embodiment, the control unit is programmed to switch on an alarm warning light if the tool is not at the operating position when blowing starts. This disclosure also provides an accessory for an apparatus for mounting and demounting a tyre to and from a corresponding wheel rim.

In one embodiment, the accessory comprises a rod. The accessory comprises a tool. The tool is fixed to the rod. The tool comprises an elastic element.

In one embodiment, the elastic element is a compression spring. The spring has a first end which is connected to the rod and a second end which is connected to a body of the tool. Thus, the spring allows moving the end of the tool closer to the rod under the action of compressing the spring.

The elastic element is, in one embodiment, a compressible rubber. In one embodiment, the compressible rubber is an element having a first end which is connected to the rod and a second end which is connected to a body of the tool. In one embodiment, the compressible rubber covers the tool. In one embodiment, the compressible rubber also has sound insulation properties.

In one embodiment, the outside surface of the tool or the outside surface at least of the end of the tool is made from a material with good sound absorption properties (for example, felt or rubber). In one embodiment, therefore, the outside surface of the tool (or the outside surface at least of the end of the tool) has a high sound absorption coefficient (in other words, it is sound absorbing).

In one embodiment, the accessory includes a coat made of a material having sound absorption properties (for example, felt or rubber). The end of the tool is covered by the coat.

In one embodiment, the accessory comprises a tool actuator. In one embodiment, the actuator includes a liner in which the rod is slidable. The actuator may be pneumatic. The actuator may be hydraulic. The actuator may be electrical.

BRIEF DESCRIPTION OF THE DRAWINGS

These and other features will become more apparent from the following detailed description of a preferred, non-limiting embodiment, illustrated by way of example in the accompanying drawings, in which:

FIG. 3A illustrates the tool of FIG. 2A;

FIG. 3B shows a cross section of FIG. 3A;

FIGS. 4A and 4B illustrate respective tools of the apparatus of FIG. 1 at an operating position;

FIGS. 4C and 4D show the tool of FIG. 2A in respective cross sections;

DESCRIPTION OF THE PREFERRED EMBODIMENTS

Figure 1:
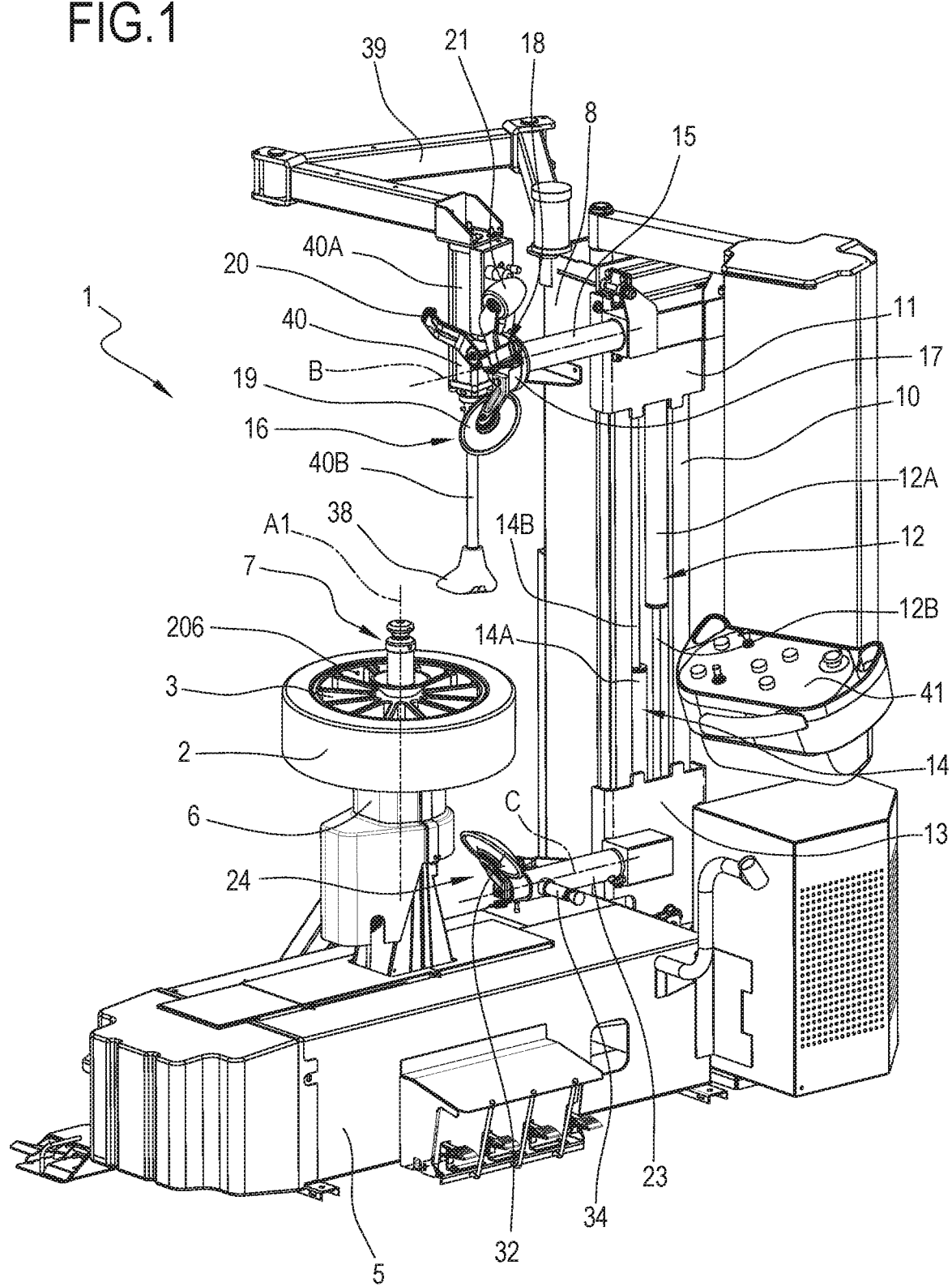
FIG. 1 illustrates a tyre changing apparatus according to this disclosure.
Figure 2A:
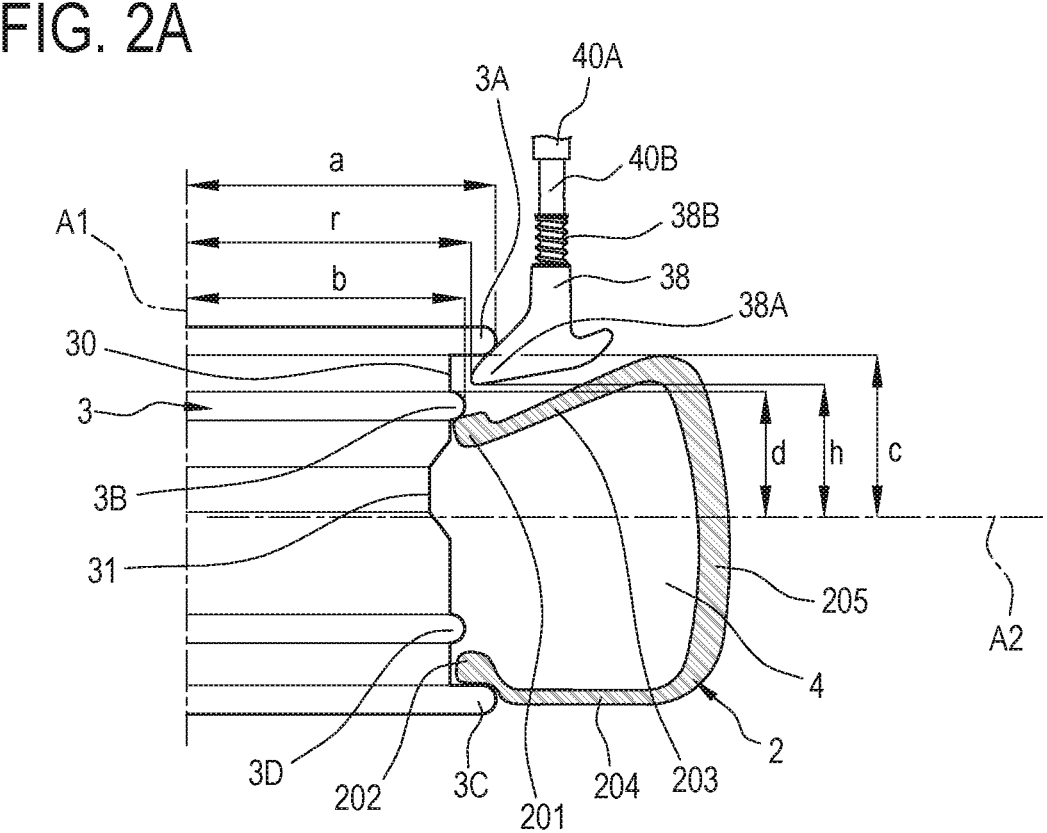
FIG. 2A illustrates a variant embodiment of a tool of the apparatus of FIG. 1 at an operating position.
Figure 2B:
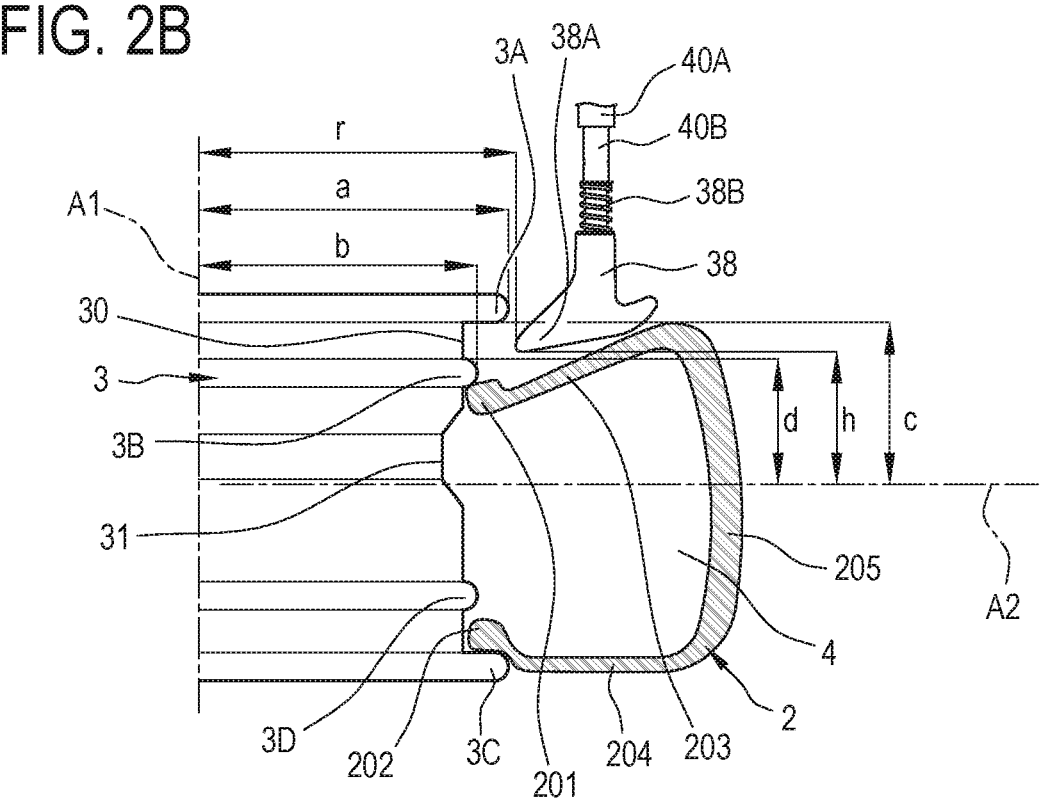
FIG. 2B illustrates a possible variant embodiment of the tool of FIG. 2A at an operating position.
Figure 5:
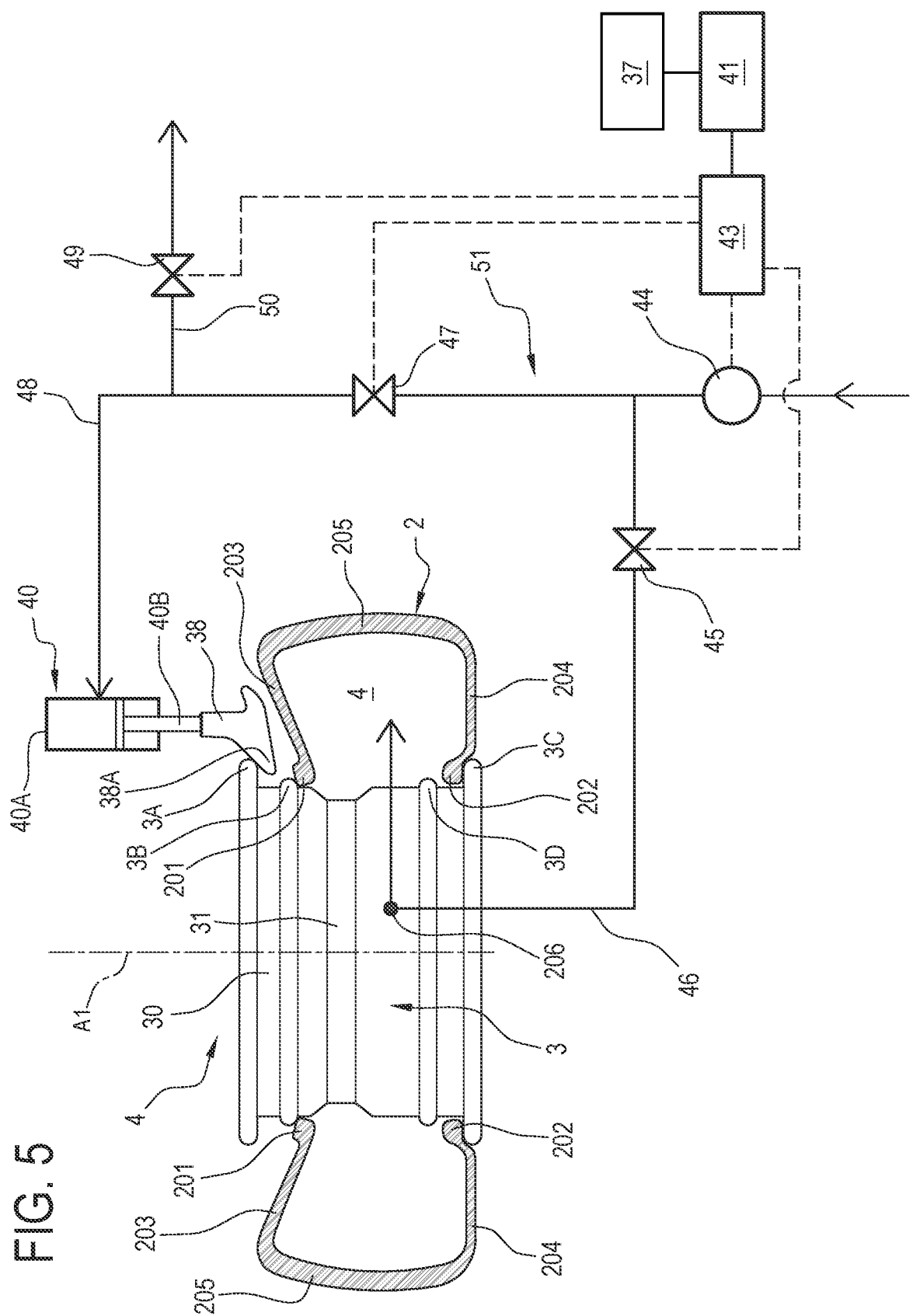
FIG. 5 schematically illustrates a variant embodiment of an inflation unit associated with a tool of the apparatus of FIG. 1, placed at the operating position.

With reference to the accompanying drawings, the numeral 1 denotes an apparatus according to this disclosure, for mounting a tyre 2 on a corresponding wheel rim 3.

The apparatus 1 comprises a base 5. The base 5 comprises a wheel-holder unit 6. The wheel-holder unit 6 is configured to receive the wheel and to cause it to rotate about an axis of rotation A1 of the wheel in order to allow mounting and demounting operations to be carried out. Preferably, the axis of rotation A1 of the wheel is vertical. In possible embodiments, the axis of rotation A1 of the wheel is horizontal or oriented in another way.

The wheel-holder unit 6 comprises a hollow shaft, connected to rotation means (not illustrated) and a supporting table (not illustrated) with a hole through it to allow a clamping rod 7 to pass through it.

The wheel is locked in place to allow it to turn as one with the shaft of the wheel-holder unit 6. For this purpose, once the wheel has been positioned on the supporting table, the clamping rod 7 is inserted into a hole in the wheel-holder unit 6 and then tightened to keep the rim 3 locked in place.

When the wheel is positioned on a supporting table with a vertical axis, the tyre 2 has a second sidewall 204 (or lower sidewall) facing towards the base 5 and a first sidewall 203 (or upper sidewall) facing the opposite direction relative to the lower side wall. Each of the two sidewalls is connected to a respective bead, that is to say, the reinforced edge of the tyre 2, in contact with the rim 3. More specifically, the first sidewall 203 is connected to a first bead 201. The second sidewall 204 is connected to a second bead 202. The tyre comprises a tyre tread 205, interposed between and connected to the first sidewall 203 and to the second sidewall 204.

The rim 3 has an outside surface 30. Jutting out from the outside surface 30 are a first (annular) flange 3A and a second (annular) flange 30. The second flange 3C (the bottom flange in the case of the wheel with a vertical axis of rotation) faces towards the base 5, while the first flange 3A (the upper flange in the case of the wheel with a vertical axis of rotation) is opposite to the second flange 3C. The outside surface 30 has a central (annular) groove 31 between the first flange 3A and the second flange 3C.

Also jutting out from the outside surface 30 are a first (annular) rib 3B and a second (annular) rib 3D. It should be noted that the first rib 3B and the second rib 3D jut out less than the first flange 3A and the second flange 30. The first rib 3B is interposed between the central groove 31 and the first flange 3A. The second rib 3D is interposed between the central groove 31 and the second flange 3C.

The space between the first flange 3A and the first rib 3B defines a first seat in which the first bead 201 of the tyre 2 is positioned when the tyre 2 is mounted and inflated. The space between the second flange 3C and the second rib 3D defines a second seat in which the second bead 202 of the tyre 2 is positioned when the tyre 2 is mounted and inflated. More specifically, during mounting operations, the second bead 202 enters the second seat, while the first bead 201 remains at a temporary position under the first rib 3B (that is, between the first rib 3B and the central groove 31. During a subsequent step of inflating, the first bead 201 enters the first seat.

The wheel-holder unit 6 is coupled to the base 5 to be moved in a direction perpendicular to the axis of rotation of the wheel A1.

In one embodiment, the apparatus 1 comprises a column 8, associated with the base 5 and extending in a direction parallel to the axis of rotation of the wheel A1. Preferably, the column 8 extends vertically. The wheel-holder unit 6 may therefore be moved towards or away from the column 8, allowing the tyre changing machine 1 to operate on tyres of different diameters.

The column 8 comprises a guide 10 extending along the main direction of extension of the column 8. An upper carriage 11 is slidably constrained to the guide 10 to move up or down along the guide 10. A first drive system 12 is associated with the upper carriage 11 with the purpose of moving the upper carriage 11 between a first upper end position and a second lower end position along the guide 10.

The first drive system 12 associated with the upper carriage 11 comprises a first piston 12A. The first piston 12A is provided with an axial hole to be slidably coupled to a first guide rod 12B. More specifically, the first guide rod 12B is integral with the column 8 and the upper end of the first piston 12A is coupled to the upper carriage 11.

An upper arm 15 has a first and a second end. The first end of the upper arm 15 is coupled to the upper carriage 11. More specifically, the coupling is such as to allow the upper arm 15 to rotate about a second, upper axis of rotation B. Preferably, the upper axis of rotation B is perpendicular to the axis of rotation A1 of the wheel. The second end of the upper arm 15 is connected to an upper operating head 16 which is integral with the upper arm 15.

A lower carriage 13 is slidably constrained to the guide 10 in order to move up or down along the guide 10. A second drive system 14 is associated with the lower carriage 13 with the purpose of moving the lower carriage 13 between a first, lower end position and a second, upper end position along the guide 10. Preferably, the upper carriage 11 and the lower carriage 13 are slidably constrained to the same guide 10.

The second drive system 14 comprises a second piston 14A. The second piston 14A is provided with an axial hole to be slidably coupled to a second guide rod 14B. More specifically, the second guide rod 14B is integral with the column 8 and the lower end of the second piston 14A is coupled to the lower carriage 13.

A lower arm 23 has a first and a second end. The first end of the lower arm 23 is fixed to the lower carriage 13. The second end of the lower arm 23 is coupled to a lower operating head 24.

The upper operating head 16 consists of a body 17 comprising at least one upper mounting tool 18 and at least one further tool. The upper mounting tool 18 is defined by an elongate body extending in one direction so as to be operatively inserted between the first bead 201 of the tyre 2 and the first flange 3A of the rim 3.

Preferably, the upper mounting tool 18 and the further tool are angularly spaced by a preset angle to be selectively and alternately positionable in an operating (that is, working) configuration by rotation of the upper operating head 16.

Preferably, the further tool is an upper bead breaker tool 19 or a demounting tool 20. The demounting tool 20 is elongate in shape in one direction—for example, claw-like—to be inserted between the first bead 201 of the tyre 2 and the first flange 3A of the rim 3, in order to grip and extract a portion of the first bead 201 from the first seat. The upper bead breaker tool 19 comprises a circular body supported by a supporting arm. The circular body is configured to press the first bead 201 of the tyre 2 towards the second bead 202 in order to detach it from the first flange 3A of the rim 3.

According to this disclosure, the apparatus includes a sidewall pressing tool 21. The sidewall pressing tool 21 is connected to the upper operating head 16, preferably rigidly.

In one embodiment, the upper operating head 16 comprises, in addition to the upper mounting tool 18 coupled to the sidewall pressing tool 21, two further tools, namely the upper bead breaker tool 19 and the demounting tool 20.

The rotational motion of the upper arm 15 is controlled by a rack meshed with a toothed wheel. The toothed wheel is coupled to the upper arm 15 to rotate about the upper axis of rotation B.

The upper arm 15 can also be driven along the upper axis of rotation B between a working position, where the tools of the upper head 16 are aligned with the first flange 3A of the rim 3 to perform all the operations, and a disengaged position, where the upper operating head 16 is away from the rim as to enable the wheel to be placed on and removed from the wheel-holder unit 6.

The lower operating head 24 is coupled to the second end of the lower arm 23 and is provided with at least one lower tool which is designed to operate on the second sidewall 202 of the tyre.

Preferably, the lower operating head 24 comprises at least two tools, namely a lower bead breaker tool 32 and a lower mounting tool. Like the upper bead breaker tool 19, the lower bead breaker tool 32 is configured to press the second bead 202 of the tyre 2 and to rotate about its axis when it is in contact with the wheel, which is simultaneously rotating on the wheel-holder unit 6. The lower mounting tool is defined by an elongate body extending in one direction so as to be operatively inserted between the second bead 202 of the tyre 2 and the second flange 3C of the rim 3 in order to place the second bead 202 in the second seat.

Preferably, the tools of the lower operating head 24 are radially spaced by a predetermined angle so as to be selectively and alternately positionable in an operating configuration by rotation of the lower operating head 24 about a lower axis of rotation C. Preferably, the lower axis of rotation C and the upper axis of rotation B are parallel.

In one embodiment, the tyre changing apparatus 1 comprises an auxiliary tool 38. The auxiliary tool 38 can be associated with the first sidewall 203 of the tyre 2 during the step of mounting. The auxiliary tool 38 is configured to press the first sidewall 203 of the tyre in a zone where the bead 201 has already been inserted into the first seat of the rim 3. When it is associated with the first sidewall 203 of the tyre 2, the auxiliary tool 38 is integral with the wheel which is rotating on the wheel-holder unit 6.

In one embodiment, the auxiliary tool 38 is connected to the column 8 by an articulated arm 39 which allows it to move in a plane perpendicular to the axis of rotation of the wheel A1. The auxiliary tool 38 can be driven in a direction parallel to the axis of rotation A1 of the wheel by an actuator 40 coupled to the articulated arm 39. The actuator 40 comprises a liner 40A defining a hole in which a rod 40B which supports the auxiliary tool 38 is slidably coupled.

The tyre changing apparatus 1 comprises an inflation unit 51. In one embodiment, the inflation unit comprises an inflation probe 46. The inflation unit 51 can be used in an active configuration in which it is configured to blow air into the chamber 4 through the inflation probe 46. The inflation unit 51 can be used in an inactive configuration in which air is prevented from being blown out of an inflation probe 46.

In one embodiment, the inflation probe 46 comprises a hose 52 configured to have air or other gas flowing through it. The hose 52 includes an end 53 which is configured to be coupled to the valve 206 of the tyre to blow air or other gas into the chamber 4.

In one embodiment, the hose 52 is extractable from the supporting rod 40B of the tool 38. In one embodiment, the hose 52 is removably fixed to the outside of the supporting rod 403 of the tool 38. To connect the hose 52 to the inflation valve 206, it is necessary to withdraw it (extracting or detaching it) from the rod 40B and place it manually in contact with the inflation valve 206.

In one embodiment, the inflation probe 46 comprises an inflation duct 54. The inflation duct 54 is configured to convey compressed air between the first flange 3A of the rim and the first bead 201 of the tyre to blow air or other gas into the chamber 4. In one embodiment, the inflation duct 54 is formed inside the tool 38 and the supporting rod 40B thereof. In one embodiment, when compressed air is blown between the first flange 3A and the first bead 201, the tool 38 is at the operating position. This solution is useful when the size of the gap between the first flange 3A and the first bead 201 is such that the air blown in through the inflation valve 206 is able to escape through the gap, making inflation impossible.

The inflation unit 51 comprises a pressure reducer 44. The pressure reducer 44 is connected to a compressor. In one embodiment, the compressor is outside the tyre changing apparatus. The pressure reducer 44 is connected to the inflation probe 46 to blow air (or other gas) into a chamber 4 which is delimited by the tyre 2 coupled to the rim 3. The tyre 2 comprises an inflation valve 206 to which one end of the inflation probe 46 is connectable.

The auxiliary tool 38 is movable at least between a rest position, where it is away from the tyre 2, and an operating position, where it is close to the tyre 2. The apparatus 1 includes an operating configuration in which the tool 38 is at the operating position and the inflation unit is in the active configuration. The inflation unit 51 is configured to blow air (or other gas) into the chamber 4 when the auxiliary tool 38 is at the operating position. More specifically, when the auxiliary tool 38 is at the operating position, the first bead 201 is interposed between the auxiliary tool 38 and the second bead 202. Further, when the auxiliary tool 38 is at the operating position, one end 38A of the auxiliary tool 38 is positioned axially (that is, along a direction parallel to the axis of rotation A1) between the first flange 3A and the first rib 3B.

In one embodiment, when the tool 38 is at the operating position, the end 38A of the tool 38 is positioned radially (that is along a centre axis A2 of the wheel, perpendicular to the axis of rotation A1 of the wheel) between an annular edge of the first flange 3A and an annular edge of the first rib 3B.

In one embodiment, when the tool 38 is at the operating position, the end 38A of the auxiliary tool 38 is positioned radially between an annular edge of the first flange 3A and the tyre tread 205.

Like the auxiliary tool 38, the upper bead breaker tool 19 is also movable at least between a rest position, where it is away from the tyre 2, and an operating position, where it is close to (in contact with) the tyre 2. The inflation unit 51 is adapted to blow air (or other gas) into the chamber 4 when the upper bead breaker tool 19 is at the operating position. More specifically, when the upper bead breaker tool 19 is at the operating position, the first bead 201 is interposed between the upper bead breaker tool 19 and the second bead 202. Further, when the upper bead breaker tool 19 is at the operating position, one end 19A of the upper bead breaker tool 19 is positioned axially (that is, along a direction parallel to the axis of rotation A1) between the first flange 3A and the first rib 3B.

In one embodiment, when the upper bead breaker tool 19 is at the operating position, the end 19A of the upper bead breaker tool 19 is positioned radially (that is along the wheel centre axis A2) between the annular edge of the first flange 3A and the annular edge of the first rib 3B. In one embodiment, when the upper bead breaker tool 19 is at the operating position, the end 19A of the upper bead breaker tool 19 is positioned radially between an annular edge of the first flange 3A and the tyre tread 205.

Like the auxiliary tool 38 and the upper bead breaker tool 19, the upper mounting tool 18 is also movable at least between a rest position, where it is away from the tyre 2, and an operating position, where it is close to the tyre 2. The inflation unit 51 is adapted to blow air (or other gas) into the chamber 4 when the upper mounting tool 18 is at the operating position. More specifically, when the upper mounting tool 18 is at the operating position, the first bead 201 is interposed between the upper mounting tool 18 and the second bead 202. Further, when the upper mounting tool 18 is at the operating position, one end 18A of the upper mounting tool 18 is positioned axially (that is, along a direction parallel to the axis of rotation A1) between the first flange 3A and the first rib 3B.

In one embodiment, when the upper mounting tool 18 is at the operating position, the end 18A of the upper mounting tool 18 is positioned radially (that is along the wheel centre axis A2) between the annular edge of the first flange 3A and the annular edge of the first rib 3B.

In one embodiment, when the upper bead breaker tool 19 is at the operating position, the end 19A of the upper bead breaker tool 19 is positioned radially between an annular edge of the first flange 3A and the tyre tread 205.

In one embodiment, the lower bead breaker tool 32 is movable at least between a rest position, where it is away from the tyre 2, and an operating position, where it is close to the tyre 2. The inflation unit 51 is adapted to blow air (or other gas) into the chamber 4 when the lower bead breaker tool 32 is at the operating position. More specifically, when the lower bead breaker tool 32 is at the respective operating position, the second bead 202 is interposed between the lower bead breaker tool 32 and the first bead 201. Further, when the lower bead breaker tool 32 is at the respective operating position, one end of the lower bead breaker tool 32 is positioned axially between the second flange 3C and the second rib 3B and positioned radially between the outside surface of the rim 30 and the tyre tread 205.

In one embodiment, the lower demounting tool is movable at least between a rest position, where it is away from the tyre 2, and an operating position, where it is close to the tyre 2. The inflation unit 51 is adapted to blow air (or other gas) into the chamber 4 when the lower demounting tool is at the operating position. More specifically, when the lower demounting tool is at the operating position, the second bead 202 is interposed between the lower demounting tool and the first bead 201. Further, when the lower demounting tool is at the respective operating position, one end of the lower demounting tool is positioned axially between the second flange 3C and the second rib 3B and positioned radially between the outside surface of the rim 30 and the tyre tread 205.

In one embodiment, the compressor is connectable to the liner 40A of the actuator 40 through a pressure reducer 44. The inflation unit may comprise an actuating branch 48 which connects the pressure reducer 44 to the liner 40A. That way, the liner 40A may be pressurized at a pressure equal to (or at a pressure proportional to) a pressure of the chamber 4. In one embodiment, the inflation unit 51 comprises a first valve 47, located in the actuating branch 48.

In one embodiment, the inflation unit 51 comprises a second valve 45, located in the inflation probe 46 to open and close the inflation probe 46. In one embodiment, the inflation unit 51 comprises a discharge valve 49. The discharge valve 49 is located in a discharge branch 50 which connects the actuating branch 48 (hence the liner 40A) to an outside atmosphere. The discharge valve 49, when open, depressurizes the liner 40A by putting it in communication with the outside atmosphere. The discharge valve 49, when closed, isolates the liner 40A from the outside atmosphere.

In one embodiment, the apparatus 1 comprises a control unit 43. The inflation unit 51 can be controlled by the control unit 43. More specifically, the control unit 43 is programmed to control the first valve 47 (to open and close it). More specifically, the control unit 43 is programmed to drive the first valve 45 (to open and close it). More specifically, the control unit 43 is programmed to drive the discharge valve 49 (to open, close or partialize it).

The control unit 43 is programmed to drive the pressure reducer 44 to regulate the internal pressure of the inflation unit. The pressure reducer 44 is connected to the compressor. In one embodiment, the apparatus 1 comprises an interface 41 connected to the control unit 43. The interface 41 is configured to receive as a setting from a user a threshold parameter representing a threshold pressure (which may be the pressure required in the chamber after inflation).

In one embodiment, the apparatus 1 comprises a pressure sensor configured to measure a pressure of the chamber 4. The pressure sensor is connected to the control unit 43 to send it a pressure signal representing the pressure of the chamber 4.

In one embodiment, the control unit 43 is programmed to control the opening of the discharge valve 49 as a function of the pressure signal and of the threshold parameter (when the pressure in the chamber 4 reaches the threshold pressure).

In one embodiment, the apparatus comprises a camera 37. The camera 37 is, in one embodiment, configured to capture an image representing a position of the first flange 3A and a position of the first rib 3B. The camera 37 is, in one embodiment, configured to capture an image representing a position of the second flange 3C and of the second rib 3D. The camera 37 is connected to the actuator 40 to place the tool at the operating position as a function of the position of the first flange 3A and of the position of the first rib 3B (or as a function of the second flange 3C and of the second rib 3D). In one embodiment, the camera 37 is connected to the control unit 43.

In one embodiment, the auxiliary tool 38 comprises a compression spring 38B. The spring 38B is connected to the rod 40B. The rod 40B supports the tool whether it is slidable in the liner 40A or connected directly to the articulated arm 39. When at rest, the spring 38B keeps the end 38A of the tool 38 clear of the rod 40B. When compressed, the spring 38B allows the end 38A of the auxiliary tool 38 tol move close to the rod 40B.

In one embodiment, the upper bead breaker tool 19 comprises a compression spring which, if compressed, allows the end 19A of the upper bead breaker tool 19 close to the body 17 of the upper operating head 16. In one embodiment, the upper mounting tool 18 comprises a compression spring which, if compressed, allows the end 18A of the upper mounting tool 18 close to the body 17 of the upper operating head 16.

In one embodiment, the auxiliary tool 38 (or at least the end of it 38A) has an outside surface which is made of (or covered by) a material with a high sound absorption coefficient (for example, felt or rubber). In one embodiment, the upper mounting tool 18 (or at least the end of it 18A) has an outside surface which is made of (or covered by) a material with a high sound absorption coefficient.

In one embodiment, the upper bead breaker tool 19 (or at least the end of it 19A) has an outside surface which is made of (or covered by) a material with a high sound absorption coefficient.

This description also provides an auxiliary accessory for a tyre changing apparatus 1.

In one embodiment, the accessory is an auxiliary accessory. The auxiliary accessory comprises a rod 40B. The auxiliary accessory comprises a tool 38 fixed to the rod 40B and comprising a compression spring 38B. The spring 38B is connected to the rod 40B and to one end 38A of the tool 38 so as to allow the end 38A of the tool 38 to move close to the rod 40B under the compressive action of the spring 38B.

In one embodiment, the accessory is connectable to an upper operating head 16 comprising a body 17. In one embodiment, the accessory comprises an upper arm (or rod) 15. In one embodiment, the accessory is structured like an upper bead breaker tool 19, connected to the body 17. In one embodiment, the accessory is structured like an upper mounting tool 18, connected to the body 17. The accessory may comprise a compression spring, connected to the body 17 and to one of either the upper bead breaker tool 19 or the upper mounting tool 18 to allow it to move close to the body 17 under the compressive action of the spring.

In one embodiment, the accessory is covered by a material having sound absorption properties (for example, felt or rubber).

In one embodiment, the accessory is covered by an elastic material (for example, rubber) having the twofold function of damping the impact of the bead and to deaden noise.

This disclosure also provides a method for inflating a tyre 2 mounted on a corresponding wheel rim 3. The rim is fixed to a wheel-holder unit 6 of an apparatus 1 for mounting and demounting a tyre 2 to and from a corresponding wheel rim 3 (also called tyre changing apparatus 1).

The tyre changing apparatus 1 comprises a plurality di tools. In one embodiment, the plurality of tools comprises an auxiliary tool 38. In one embodiment, the plurality of tools comprises an upper mounting tool 18. In one embodiment, the plurality of tools comprises an upper bead breaker tool 19.

The tyre 2 includes a first bead 201, a first sidewall 203, a second bead 202, a second sidewall 204 and a tyre tread 205.

The rim 3 includes an outside surface 30, a first flange 3A, a first rib 3B, a second flange 3C, a second rib 3D and a central groove 31. The first flange 3A and the first rib 3B jut out radially from the outside surface 30 and are axially spaced from each other (along an axis of rotation A1 of the wheel) to define a first seat for the first bead 201. The second flange 3C and the second rib 3D jut out radially from the outside surface 30 and are axially spaced from each other (along an axis of rotation A1 of the wheel) to define a second seat for the second bead 202. The central groove 31 is interposed between the first flange 3A and the first rib 3B on one side and between the second flange 3C and the second rib 3D on the other side.

The method comprises a step of mounting the tyre 2 to the rim 3 before proceeding to the step of inflating. During the step of mounting, the first bead 201 is not inserted into the first seat but remains at a respective temporary position between the first rib 3B and the central groove 31 of the rim. Similarly, the second bead 202 is not inserted into the second seat but remains at a respective temporary position between the second rib 3D and the central groove 31 of the rim.

Defined is a wheel centre axis A2 which is perpendicular to an axis of rotation A1 of the wheel, so that the first flange 3A and the second flange 3C are equidistant from the wheel centre axis A2. Defined is an axial distance 'd' of an upper edge of the first rib 3B from the wheel centre axis A2. By upper edge of the first rib 3B is meant the annular surface of the first rib 3B facing towards the first flange 3A. The distance of the first bead 201 from the wheel centre axis A2 after mounting and before inflating (that is, at the temporary position) is less than 'd'.

The step of inflating comprises a first step of placing a tool at an operating position.

In one embodiment, the auxiliary tool 38 is placed at the operating position.

When the auxiliary tool 38 is at the operating position, one end of it 38A is spaced from the wheel centre axis A2 by an axial distance 'h'. In one embodiment, the axial distance 'h' of the end 38A of the auxiliary tool 38 from the wheel centre axis A2 is greater than the axial distance 'd' of the upper edge of the first rib 3B from the wheel centre axis A2. In one embodiment, the axial distance 'h' of the end 38A of the auxiliary tool 38 from the wheel centre axis A2 is less than the axial distance 'd' of the upper edge of the first rib 3B from the wheel centre axis A2 but greater than a distance of the lower edge of the first rib 3B from the wheel centre axis A2.

Also defined is an axial distance 'c' of a lower edge of the first flange 3A from the wheel centre axis A2. By lower edge of the first rib 3A is meant the annular surface of the first flange 3A facing towards the first rib 3B. The axial distance 'h' of the end 38A of the auxiliary tool 38 from the wheel centre axis A2 is less than the axial distance 'c' of the lower edge of the first flange 3A from the wheel centre axis A2.

Defined is a radial distance 'a' of an outer edge of the first flange 3A from the axis of rotation A1 of the wheel. By outer edge of the first flange 3A is meant a ring portion of the first flange 3A which protrudes the most from the outside surface of the rim 30.

Defined is a radial distance 'b' of an outer edge of the first rib 3B from the axis of rotation A1 of the wheel. By outer edge of the first rib 3B is meant a ring portion of the first rib 3B which protrudes the most from the outside surface of the rim 30.

Defined is a radial distance 'r' of the end 38A of the auxiliary tool 38 from the axis of rotation A1 of the wheel when the auxiliary tool 38 is at the operating position. The radial distance 'r' of the end 38A of the auxiliary tool 38 from the axis of rotation A1 of the wheel is greater than the radial distance 'b' of the outer edge of the first rib 3B from the axis of rotation A1 of the wheel. In one embodiment, the radial distance 'r' of the end 38A of the auxiliary tool 38 from the axis of rotation A1 of the wheel is less than the radial distance 'a' of the outer edge of the first flange 3A from the axis of rotation A1 of the wheel. In another embodiment, the radial distance 'r' of the end 38A of the auxiliary tool 38 from the axis of rotation A1 of the wheel is greater than the radial distance 'a' of the outer edge of the first flange 3A from the axis of rotation A1 of the wheel.

In one embodiment, the upper bead breaker tool 19 is placed at an operating position.

When the upper bead breaker tool 19 is at the operating position, one end of it 19A is spaced from the wheel centre axis A2 by an axial distance 'h1'. The axial distance 'h1' of the end 19A of the upper bead breaker tool 19 from the wheel centre axis A2 is greater than the axial distance 'd' of the upper edge of the first rib 3B from the wheel centre axis A2. The axial distance 'h1' of the end 19A of the upper bead breaker tool 19 from the wheel centre axis A2 is less than the axial distance 'c' of the lower edge of the first flange 3A from the wheel centre axis A2.

Defined is a radial distance 'r1' of the end 19A of the upper bead breaker tool 19 from the axis of rotation A1 of the wheel when the upper bead breaker tool 19 is at the operating position. The radial distance 'r1' of the end 19A of the upper bead breaker tool 19 from the axis of rotation A1 of the wheel is greater than the radial distance 'b' of the outer edge of the first rib 3B from the axis of rotation A1 of the wheel. In one embodiment, the radial distance 'r1' of the end 19A of the upper bead breaker tool 19 from the axis of rotation A1 of the wheel is less than the radial distance 'a' of the outer edge of the first flange 3A from the axis of rotation A1 of the wheel. In another embodiment, the radial distance 'r1' of the end 19A of the upper bead breaker tool 19 from the axis of rotation A1 of the wheel is greater than the radial distance 'a' of the outer edge of the first flange 3A from the axis of rotation A1 of the wheel.

In one embodiment, the upper mounting tool 18 is placed at an operating position.

When the upper mounting tool 18 is at the operating position, one end of it 18A is spaced from the wheel centre axis A2 by an axial distance 'h2'. The axial distance 'h2' of the end 18A of the upper mounting tool 18 from the wheel centre axis A2 is greater than the axial distance 'r1' of the upper edge of the first rib 3B from the wheel centre axis A2. The axial distance 'h2' of the end 18A of the upper mounting tool 18 from the wheel centre axis A2 is less than the axial distance of the lower edge of the first flange 3A from the wheel centre axis A2.

Defined is a radial distance 'r2' of the end 18A of the upper mounting tool 18 from the axis of rotation A1 of the wheel when the upper mounting tool 18 is at the operating position. The radial distance 'r2' of the end 18A of the upper mounting tool 18 from the axis of rotation A1 of the wheel is greater than the radial distance 'b' of the outer edge of the first rib 3B from the axis of rotation A1 of the wheel. In one embodiment, the radial distance 'r2' of the end 18A of the upper mounting tool 18 from the axis of rotation A1 of the wheel is less than the radial distance 'a' of the outer edge of the first flange 3A from the axis of rotation A1 of the wheel. In another embodiment, the radial distance 'r2' of the end 18A of the upper mounting tool 18 from the axis of rotation A1 of the wheel is greater than the radial distance 'a' of the outer edge of the first flange 3A from the axis of rotation A1 of the wheel.

Like the auxiliary tool 38, the upper mounting tool 18 and the upper bead breaker tool 19, other tools of the tyre changing apparatus 1 can be placed at the operating position.

In one embodiment, the lower bead breaker tool 32 is placed at a respective operating position when one end of it is positioned radially between the outside surface 30 of the rim 3 and the tyre tread 205 and axially between the second rib 3C and the second flange 3D. In one embodiment, the lower demounting tool is placed at a respective operating position when one end of it is positioned radially between the outside surface 30 of the rim 3 and the tyre tread 205 and axially between the second rib 3C and the second flange 3D.

The method comprises, after the step of placing a tool at the operating position, a step of blowing pressurized gas into a chamber 4 delimited by the tyre 2 and the rim 3. The gas is blown through an inflation valve 296 of the tyre 2.

During the step of blowing, if the tool placed at the operating position is the auxiliary tool 38, the first sidewall 203 of the tyre 2 is pressed against the end 38A of the auxiliary tool 38.

During the step of blowing, if the tool placed at the operating position is the upper bead breaker tool 19, the first sidewall 203 of the tyre 2 is pressed against the end 19A of the upper bead breaker tool 19.

During the step of blowing, if the tool placed at the operating position is the upper mounting tool 18, the first sidewall 203 of the tyre 2 is pressed against the end 18A of the upper mounting tool 18.

The method comprises a step of removing the tool from the operating position (after the step of blowing). In one embodiment, the auxiliary tool 38 is removed from the operating position. In one embodiment, the upper bead breaker tool 19 is removed from the operating position. In one embodiment, the upper mounting tool 18 is removed from the operating position.

In one embodiment, where the tool at the operating position is the auxiliary tool 38, the auxiliary tool 38 comprises a compression spring 38B which, at the end of the step of blowing, is compressed by the first sidewall 203 which is pressed by the pressure of the chamber 4 against the end 38A of the tool. Compressing the spring 38B causes the auxiliary tool 38 to be displaced from the operating position. In one embodiment, compressing the spring 38B causes the tool 38 to be placed at an intermediate position, intermediate between the operating position and a rest position where the tool is clear of the tyre.

In one embodiment, the auxiliary tool 38 is supported by a rod 40B which is slidable in a liner 40A of an actuator 40. In one embodiment, the liner 40A is connected to a compressor through a pressure reducer 44. The pressure reducer 44 is also connected to an inflation probe 46 to blow pressurized gas into the chamber 4 (through the inflation valve 206). In one embodiment, during the step of blowing, the pressure reducer 44 receives compressed air from the compressor to pressurize both the chamber 4 and the liner 40A of the actuator 40 so as to obtain a state of pressure equilibrium between the liner 40A and the chamber 4. The pressure equilibrium is such that the first sidewall 203 (by effect of the pressure in the chamber 4) pushes the auxiliary tool 38 towards the first flange 3A, while the rod 40B (by effect of the pressure in the liner 40A) pushes the auxiliary tool 38 towards the first sidewall 203: since the pushing forces balance each other out, the auxiliary tool 38 remains at the operating position.

In one embodiment, when the pressure of the chamber 4 (measured, for example, by a pressure sensor inside or outside the chamber 4, or by a pressure sensor in the liner 40A) reaches a threshold value, the liner 40A is depressurized by opening a discharge valve 49: as a result of depressurizing the liner 40A, the auxiliary tool 38 is pushed by the first sidewall 203 and thus removed from the operating position.

Similarly, the actuator 40 can be connected to the upper mounting tool 18, to the bead breaker 19 or to another tool of the tyre changing apparatus 1 to keep it at the operating position during the step of blowing and to remove it from the operating position at the end of the step of blowing.

The invention claimed is:

1. A method for inflating a tyre by means of a tyre changing apparatus equipped with a base, a column associated with the base, wheel holder unit, and a tool provided with an actuator, where the tyre is mounted on a corresponding wheel rim, the rim being fixed to a wheel-holder unit of the tyre changing apparatus, where the tyre includes a first bead, a first sidewall, a second bead, a second sidewall and a tread and where the rim includes an outside surface, a first flange and a first rib, where the first flange and the first rib jut out radially from the outside surface and are axially spaced from each other to define a first seat for the first bead, wherein the tool is a bead breaker tool or a bead pressing tool, the method comprising the following steps, in sequence:
placing, through the actuator, the tool at an operating position, where one end of it is positioned axially between the first flange and the first rib and radially between the outside surface of the rim and the tyre tread, where the first bead is interposed between the tool and the second bead, wherein the tool is movably connected to the column through an arm;
blowing a gas under pressure through an inflation valve into a chamber delimited by the tyre and by the rim, while keeping the tool at the operating position during blowing, so that a portion of the first sidewall of the tyre is pressed against the end of the tool, wherein during the step of blowing, the actuator keeps the tool at the operating position;
removing the tool from the operating position, wherein the actuator includes a liner in which there slides a rod connected to the tool, wherein during the step of blowing, the liner of the actuator is pressurized in order to keep the tool at the operating position.

2. The method according to claim 1, wherein, when the tool is at the operating position, the tool faces the first sidewall of the tyre.

3. The method according to claim 2, wherein, when the tool is at the operating position, the end of the tool is positioned radially between an annular edge of the first rib and the tyre tread.

4. The method according to claim 3, wherein, when the tool is at the operating position, the end of the tool is positioned radially between the annular edge of the first rib (3B) and an annular edge of the first flange.

5. The method according to claim 1, wherein the tool comprises an elastic element, wherein when the gas blown in causes the pressure of the chamber to rise above a threshold value, the pressure in the chamber, by pressing the first sidewall of the tyre against the end of the tool compresses the elastic element and thus removes the tool from the operating position.

6. The method according to claim 1, wherein, when the pressure in the chamber reaches a threshold value, the liner is depressurized and the first sidewall of the tyre is pressed against the tool, causing the tool to be removed from the operating position.

7. The method according to claim 1, wherein the tool has an outside surface made of a material having sound absorption properties.

8. The method according to claim 1, wherein the tool includes at least a portion made of a material having sound absorption properties.

9. The method according to claim 1, wherein, in the presence of the tool, the first sidewall is pressed against the end of the tool and thus abuts or rests on the end of the tool.

10. An apparatus for mounting and demounting a tyre to and from a corresponding rim of a wheel, wherein the wheel has an axis of rotation and the tyre includes a first bead, a first sidewall, a second bead, a second sidewall and a tread and wherein the rim includes an outside surface, a first flange and a first rib, wherein the first flange and the first rib jut out radially from the outside surface and are axially spaced from each other to define a first seat for the first bead, the apparatus comprising:
a base and a column associated with the base;

a wheel-holder unit for locking the rim in place and setting it in rotation about the axis of rotation of the wheel;

an inflation unit, having an active configuration, where it is configured to blow a gas into a chamber delimited by the tyre and the rim through an inflation valve of the tyre, and an inactive configuration, where gas is prevented from escaping from the inflation unit;

a tool provided with an actuator, wherein the tool is movably connected to the column through an arm and is movable, through the actuator, at least between a rest position, where it is away from the tyre, and an operating position, where the first bead is interposed between the tool and the second bead, one end of the tool being positioned axially between the first flange and the first rib and radially between the outside surface of the rim and the tyre tread, wherein the tool is a bead breaker tool or a bead pressing tool;

wherein the apparatus includes an operating configuration in which the tool is at the operating position, the actuator keeping the tool at the operating position, and the inflation unit is, at the same time, in the active configuration, and wherein the actuator includes a liner in which there slides a rod connected to the tool, wherein the liner of the actuator is pressurized in order to keep the tool at the operating position, in the active configuration of the inflation unit.

11. The apparatus according to claim 10, wherein the tool includes an elastic element having a first end connected to the end of the tool and a second end connected to a rod which supports the tool, so as allow the end of the tool to move closer to the rod under a compressive action of the elastic element.

12. The apparatus according to claim 10, wherein the tool has an outside surface which is made of a material having sound absorption properties.

13. The apparatus according to claim 10, wherein the actuator is a pneumatic actuator configured to move the tool from the rest position to the operating position, and wherein the actuator includes a liner, in which there slides a rod that supports a the tool, and wherein the inflation unit is selectively connectable to the liner of the actuator to pressurize it at a pressure equal to a pressure inside the chamber.

14. The apparatus according to claim 13, comprising:
a control unit;
a pressure sensor configured to measure the pressure of the chamber and connected to the control unit to send it a pressure signal representing the pressure of the chamber;
a discharge valve connected to the liner of the actuator and able to be switched between an open position, in which the liner of the actuator is open onto an outside atmosphere, and a closed position, in which the liner of the actuator is isolated from the outside atmosphere;
wherein the control unit is programmed to control switching of the discharge valve from the closed to the open position as a function of the pressure signal.

15. The apparatus according to claim 10, comprising an interface configured to receive as a setting a threshold parameter representing a threshold pressure, wherein the control unit is programmed to control switching of the discharge valve from the closed to the open position as a function of the pressure signal and of the threshold parameter.

16. The apparatus according to claim 10, comprising a camera configured to capture an image representing a position of the first flange and a position of the first rib, and connected to an actuator to place the tool at the operating position as a function of the position of the first flange and of the position of the first rib.

17. The method according to claim 1, wherein removing the tool from the operating position limits a distance travelled by the first bead toward the first flange under the pressure exerted by the gas in the chamber to less than an axial distance separating the first flange from the first rib.

18. An apparatus for mounting and demounting a tyre to and from a corresponding rim of a wheel, wherein the wheel has an axis of rotation and the tyre includes a first bead, a first sidewall, a second bead, a second sidewall and a tread and wherein the rim includes an outside surface, a first flange and a first rib, wherein the first flange and the first rib jut out radially from the outside surface and are axially spaced from each other to define a first seat for the first bead, the apparatus comprising:

a base and a column associated with the base;
a wheel-holder unit for locking the rim in place and setting it in rotation about the axis of rotation of the wheel;
an inflation unit, having an active configuration, where it is configured to blow a gas into a chamber delimited by the tyre and the rim through an inflation valve of the tyre, and an inactive configuration, where gas is prevented from escaping from the inflation unit;
a tool provided with an actuator, wherein the tool is movably connected to the column through an arm and is movable, through the actuator, at least between a rest position, where it is away from the tyre, and an operating position, where the first bead is interposed between the tool and the second bead, one end of the tool being positioned axially between the first flange and the first rib and radially between the outside surface of the rim and the tyre tread, wherein the tool is a bead breaker tool or a bead pressing tool;
wherein the apparatus includes an operating configuration in which the tool is at the operating position, the actuator keeping the tool at the operating position, and the inflation unit is, at the same time, in the active configuration, and
wherein the actuator is a pneumatic actuator configured to move the tool from the rest position to the operating position, and wherein the actuator includes a liner, in which there slides a rod that supports the tool, and wherein the inflation unit is selectively connectable to the liner of the actuator to pressurize it at a pressure equal to a pressure inside the chamber.

* * * * *